(12) United States Patent
Matsushita et al.

(10) Patent No.: US 12,693,504 B2
(45) Date of Patent: Jul. 28, 2026

(54) INFRARED IMAGING LENS

(71) Applicant: Nippon Electric Glass Co., Ltd., Otsu (JP)

(72) Inventors: Yoshimasa Matsushita, Otsu (JP); Fumio Sato, Otsu (JP); Nobuo Hori, Higashimatsuyama (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 22 days.

(21) Appl. No.: 18/571,383

(22) PCT Filed: Jul. 8, 2022

(86) PCT No.: PCT/JP2022/027121
§ 371 (c)(1),
(2) Date: Dec. 18, 2023

(87) PCT Pub. No.: WO2023/008148
PCT Pub. Date: Feb. 2, 2023

(65) Prior Publication Data
US 2024/0288672 A1 Aug. 29, 2024

(30) Foreign Application Priority Data
Jul. 28, 2021 (JP) ................................. 2021-123539

(51) Int. Cl.
*G02B 13/14* (2006.01)
*G02B 13/00* (2006.01)
*G02B 13/18* (2006.01)

(52) U.S. Cl.
CPC ........... *G02B 13/14* (2013.01); *G02B 13/008* (2013.01); *G02B 13/18* (2013.01)

(58) Field of Classification Search
CPC ........ G02B 9/12; G02B 9/34; G02B 13/0035; G02B 13/004; G02B 13/14; G02B 13/008; G02B 13/06; G02B 13/18; G02B 7/028
(Continued)

(56) References Cited

U.S. PATENT DOCUMENTS

| | | | | |
|---|---|---|---|---|
| 7,859,747 B2 * | 12/2010 | Hiraiwa | ............. | G02B 27/4211 |
| | | | | 359/356 |
| 2011/0164142 A1 * | 7/2011 | Izumi | ..................... | G02B 13/14 |
| | | | | 359/356 |

(Continued)

FOREIGN PATENT DOCUMENTS

| | | |
|---|---|---|
| CN | 101963694 A | 2/2011 |
| CN | 102269871 B | 8/2013 |

(Continued)

OTHER PUBLICATIONS

Zhu et al., Surface crystallization behavior and physical properties of (GeTe4)85(AgI)15 chalcogenide glass, Sep. 2017, Infrared Physics & Technology, 86, pp. 135-138 (Year: 2017).*

(Continued)

*Primary Examiner* — Wyatt A Stoffa
*Assistant Examiner* — Samanvitha Sridhar
(74) *Attorney, Agent, or Firm* — Harness Dickey & Pierce P.L.C.

(57) ABSTRACT

Provided is a telephoto lens which is excellent in resolution. An infrared imaging lens (1) includes a first lens (L1), a second lens (L2), and a third lens (L3) each of which is made of chalcogenide glass having a refractive index of 2.5 to 4.0 measured at a wavelength of 10 μm, the infrared imaging lens (1) having a total system focal length not less than two times larger than a diameter of an image circle of the infrared imaging lens (1).

14 Claims, 7 Drawing Sheets

(58) Field of Classification Search
USPC ................................................ 359/356, 715
See application file for complete search history.

(56) References Cited

U.S. PATENT DOCUMENTS

| | | | | |
|---|---|---|---|---|
| 2011/0216397 A1* | 9/2011 | Ando | ..................... | G02B 13/14 |
| | | | | 359/357 |
| 2012/0212807 A1* | 8/2012 | Kawaguchi | ............ | G02B 13/14 |
| | | | | 359/356 |
| 2012/0212808 A1* | 8/2012 | Watanabe | .............. | G02B 13/14 |
| | | | | 359/357 |
| 2015/0206909 A1* | 7/2015 | Fujimura | ................. | G02B 3/04 |
| | | | | 359/718 |
| 2015/0301317 A1 | 10/2015 | Watanabe et al. | | |
| 2018/0372992 A1* | 12/2018 | Doujou | .................... | G02B 7/10 |
| 2019/0369364 A1 | 12/2019 | Shobayashi et al. | | |

FOREIGN PATENT DOCUMENTS

| | | |
|---|---|---|
| CN | 106842561 A | 6/2017 |
| JP | 2011253006 A | 12/2011 |
| JP | 201237697 A | 2/2012 |
| JP | 2015203850 A | 11/2015 |
| JP | 201618162 A | 2/2016 |
| JP | 20198271 A | 1/2019 |
| WO | 2014115138 A1 | 7/2014 |
| WO | 2018163831 A1 | 9/2018 |
| WO | 2020105719 A1 | 5/2020 |

OTHER PUBLICATIONS

International Search Report from PCT/JP2022/027121 dated Sep. 13, 2022.
Written Opinion for PCT/JP2022/027121 (International Preliminary Report on Patentability) dated Sep. 13, 2022.
Search Report from European Application No. 22849213.8 dated Aug. 28, 2025.
SPIE, PO Box 10 Bellingham WA 98227-0010 USA, (2014), table on p. 494.
Anonymous: InfrarotGlas/InfraredGlass IG6 (2008), pp. 1-2, p. 1, table "Material Properties".
Anonymous: Tydex Germanium (2022), pp. 1-8, p. 4, fig. 2.
Zhang X H et al. (2003). Production of complex chalcogenide glass optics by molding for thermal imaging. Journal of Non-Crystalline Solids, North-Holland Physics Publishing. Amsterdam, NL, 326-327: 519-523, fig. 4.

* cited by examiner

AP

1

L1

L2

L3

P    S

NUMERICAL EXAMPLE 1

WAVELENGTH 10 $\mu$m

RELATIVE ILLUMINANCE

IMAGE HEIGHT Y(mm)

NUMERICAL EXAMPLE 1

NUMERICAL EXAMPLE 1

INFRARED IMAGING LENS

TECHNICAL FIELD

The present invention relates to an infrared imaging lens.

BACKGROUND ART

Infrared cameras for capturing an image of a subject with use of infrared radiation in mid- and far-infrared regions, in particular, a 10 μm-band wavelength region which is suitable for biodetection, are applied to surveillance cameras, security cameras, in-vehicle night vision systems, and the like. These infrared cameras can be applied to various fields, such as intruder surveillance in important facilities, poacher surveillance, traffic monitoring, warehouse monitoring, road-obstacle monitoring, forest-fire origin detection, intra-tunnel monitoring, and maritime surveillance, and thus are expected to increase in demand. An infrared imaging lens which is applied to such an infrared camera has been known.

CITATION LIST

Patent Literature

[Patent Literature 1]
Japanese Patent Application Publication Tokukai No. 2019-8271

SUMMARY OF INVENTION

Technical Problem

Applications as typified by night-time remote surveillance require a so-called telephoto lens, which has a relatively long focal length. There is a need to achieve, in particular, an infrared imaging lens, which has excellent resolution suitable for a compact image sensor having a pixel pitch substantially equivalent to the wavelength, which covers a wide wavelength band, and which is so inexpensive as to be usable as a commercial product.

An aspect of the present invention has been made by focusing on the above problem. It is an object of an aspect of the present invention to achieve an infrared imaging lens that is a telephoto lens which has excellent resolution suitable for an image sensor having a pixel pitch substantially equivalent to the wavelength and which is applicable to a commercial use.

Solution to Problem

In order to solve the foregoing problem, an aspect of the present invention is an infrared imaging lens used in an infrared region including at least a wavelength in a range of 7 μm to 14 μm, the infrared imaging lens including a first lens, a second lens, and a third lens that are disposed in this order from an object side to an image plane side, each of the first lens, the second lens, and the third lens being made of chalcogenide glass having a refractive index of 2.5 to 4.0 measured at a wavelength of 10 μm, the infrared imaging lens having a total system focal length fL not less than two times larger than a diameter of an image circle of the infrared imaging lens.

In addition, in order to solve the foregoing problem, another aspect of the present invention is an infrared imaging lens used in an infrared region including at least a wavelength in a range of 7 μm to 14 μm, the infrared imaging lens including a first lens, a second lens, and a third lens that are disposed in this order from an object side to an image plane side, each of the first lens, the second lens, and the third lens being made of chalcogenide glass having a refractive index of 2.5 to 4.0 measured at a wavelength of 10 μm, the infrared imaging lens having a half angle of view of not more than 14°.

Advantageous Effects of Invention

According to the above aspects of the present invention, it is possible to achieve an infrared imaging lens that is a telephoto lens which has excellent resolution suitable for an image sensor having a pixel pitch substantially equivalent to the wavelength and which is applicable to a commercial use.

DESCRIPTION OF EMBODIMENTS

Embodiment

<Overview of Infrared Imaging Lens>

An infrared imaging lens 1 in accordance with an embodiment is a lens system which covers mid- and far-infrared wavelength regions and which forms an image of a subject on an image plane S of an image sensor or the like. The infrared imaging lens 1 in accordance with the present embodiment is intended for a telephoto lens, such as one having a total system focal length fL not less than two times larger than a diameter of an image circle. That is, the infrared imaging lens 1 in accordance with the present embodiment is intended for an infrared imaging lens that makes it possible to achieve an imaging device that allows, by including the infrared imaging lens 1, a distant object to be enlarged and observed.

Figure 1:
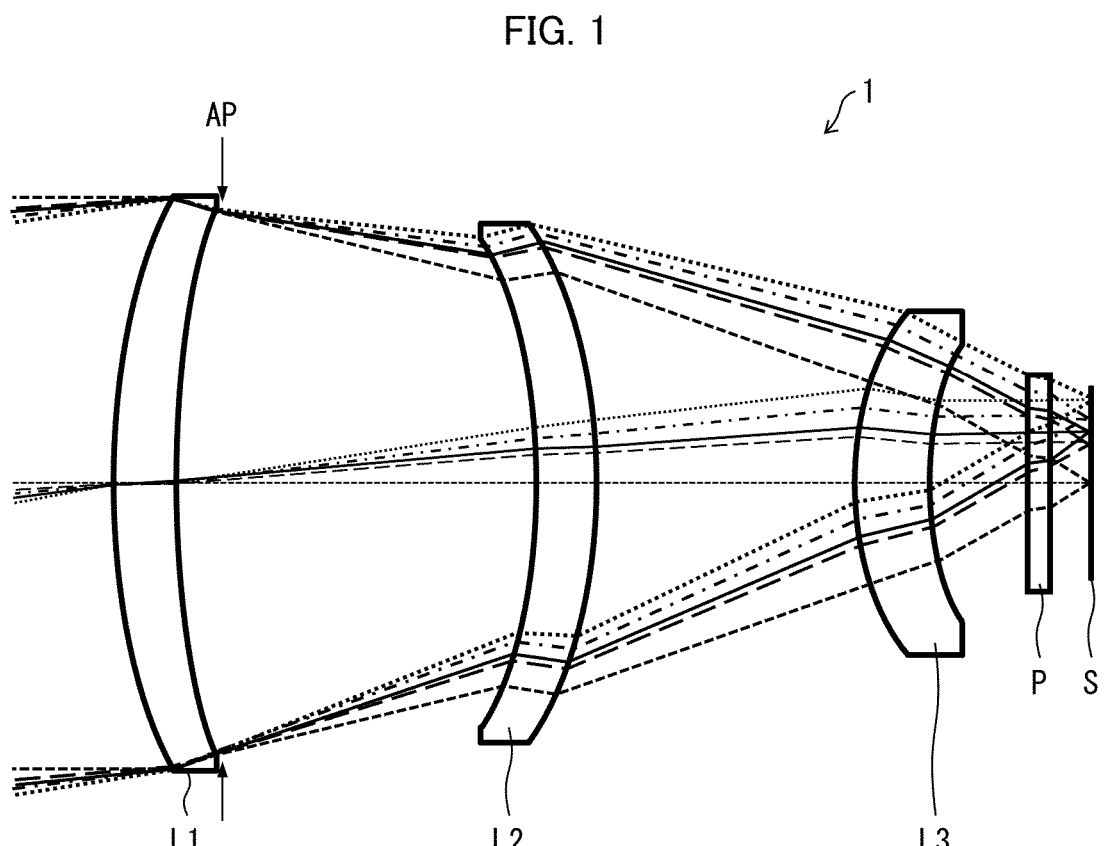
FIG. 1 is a cross-sectional view illustrating a configuration of main parts of an infrared imaging lens in accordance with an embodiment of the present invention.

FIG. 1 is a cross-sectional view illustrating a configuration of main parts of the infrared imaging lens 1 and taken along an optical axis. The infrared imaging lens 1 includes a first lens L1, a second lens L2, and a third lens L3 which are disposed in this order from an object side to an image plane S side. The first lens L1 to the third lens L3 uniformly move in the optical axis direction during focusing.

The first lens L1, the second lens L2, and the third lens L3 are each made of chalcogenide glass having a refractive index of 2.5 to 4.0 measured at a wavelength of 10 μm. The first lens L1, the second lens L2, and the third lens L3 may all be made of the same chalcogenide glass material.

Figure 2:
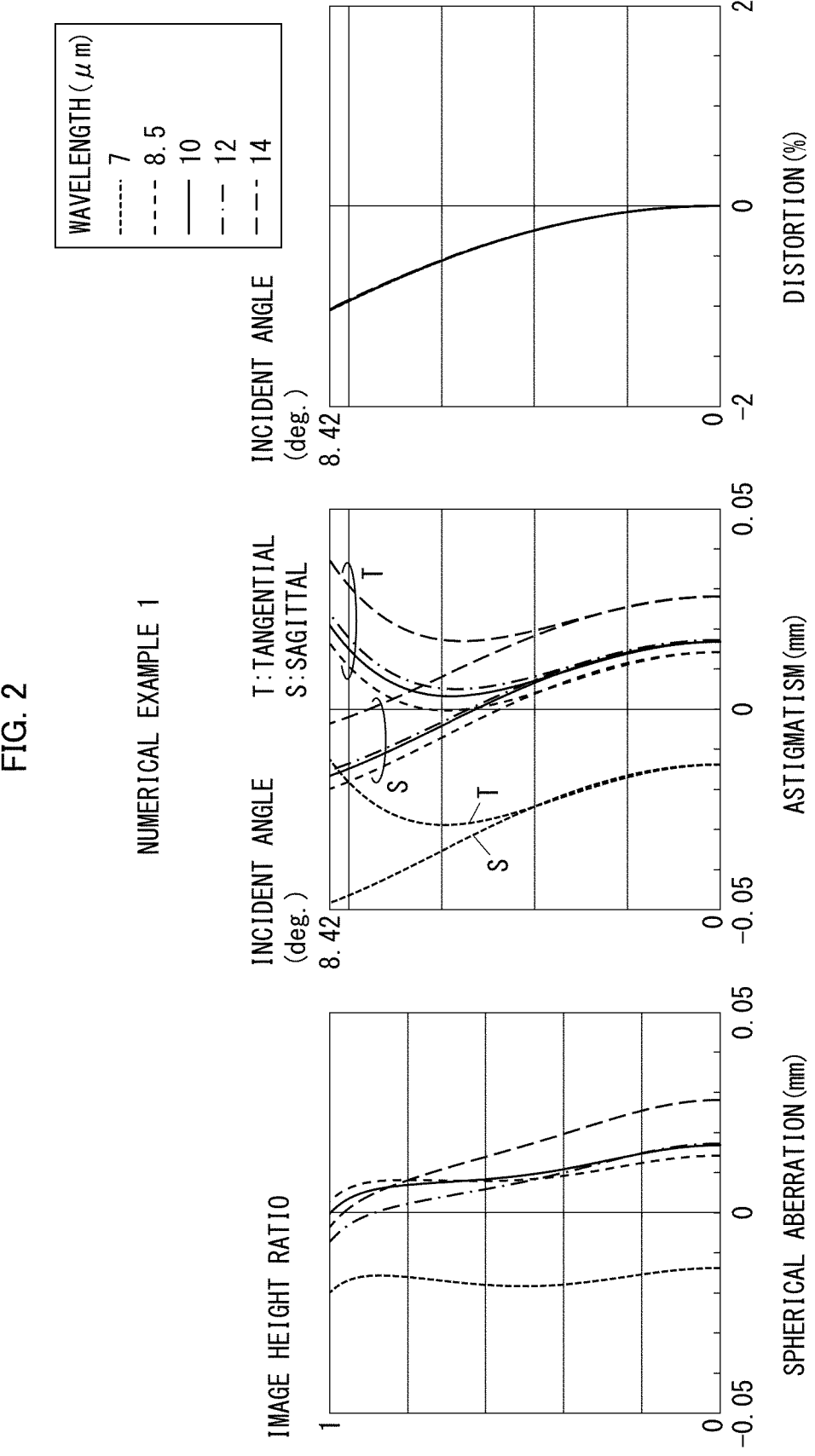
FIG. 2 is an aberration diagram showing spherical aberration, astigmatism, and distortion of an infrared imaging lens in accordance with Numerical Example 1 of the present invention.

As illustrated in FIGS. 1 and 2, a parallel flat plate P is disposed between the third lens L3 and the image plane S. The parallel flat plate P is an optical window which is hermetically sealed so as to be loaded on the image plane S side, and is made of silicon, hypoxic silicon, or germanium. The material and thickness of the parallel flat plate P can be determined in accordance with what image sensor to employ.

As indicated by the sign "AP" in FIG. 1, an effective diameter of an image plane-side surface (second surface) of the first lens L1 is equivalent to an aperture of the infrared imaging lens 1. The first lens L1, the second lens L2, the third lens L3, and the parallel flat plate P each has a surface provided with an anti-reflection (AR) coating. It is possible to apply an appropriate known technique to such an anti-reflection coating in mid- and far-infrared regions.

<Glass Material for Each Lens>

In particular, it is preferable that the chalcogenide glass contain 20% to 90% of tellurium (Te) in mole percentage and have an Abbe number of not less than 100 measured at a wavelength of 10 μm. Note that the Abbe number as used herein is defined in Numerical Example described later. Furthermore, the chalcogenide glass preferably contains 0% to 50% of germanium (Ge) and/or 0% to 50% of gallium (Ga) in mole percentage.

The chalcogenide glass having a refractive index of 2.5 to 4.0 measured at a wavelength of 10 μm, that is, having a high refractive index in such mid- and far-infrared regions, has been developed by the applicant of the present invention (see International Publication No. WO2020/105719A1). This glass material, more specifically, has achieved a refractive index in a range of 2.74 to 3.92 as measured at a wavelength of 10 μm. For example, a refractive index measured at a wavelength of 10 μm is preferably 2.74 to 3.92, 2.8 to 3.8, and particularly preferably 2.9 to 3.7. In a case where the refractive index is too low, the focal length tends to be too long.

It is also preferable that the chalcogenide glass have an Abbe number (ν10) of not less than 100, not less than 120, not less than 150, or not less than 180. The Abbe number is particularly preferably not less than 220. The Abbe number (ν10) will be defined later. In a case where the Abbe number is too low, chromatic aberration tends to be increased. An upper limit of the Abbe number is not particularly limited, but is practically not more than 350.

The glass material exhibits very little light absorption over a wide wavelength range in the mid- and far-infrared regions, such as a wavelength range of at least 7 μm to 14 μm. In particular, the glass material has a feature of exhibiting, despite being chalcogenide, little light absorption even in a wavelength region of more than 10 μm. It is possible to use an "infrared absorption edge wavelength" and an "internal transmittance" as indicators which indicate that chalcogenide glass is highly light transmissive in a far-infrared region.

Note here that the infrared absorption edge wavelength refers to an absorption edge wavelength in a region at a wavelength of not less than 8 μm and is defined by a wavelength at which a light transmittance of 20% is obtained at a thickness of 2 mm of the material. The term "internal transmittance" refers to a transmittance inside the material and does not include a reflection loss on a surface of the material. Chalcogenide glass serving as a glass material of which the first lens L1, the second lens L2, and the third lens are made has an infrared absorption edge wavelength of not less than 18 μm.

Thus, the chalcogenide glass also transmits therethrough even infrared radiation having a wavelength of more than 10 μm, and has a good transmittance in a wavelength range of at least 7 μm to 14 μm. The chalcogenide glass has an internal transmittance, measured at a thickness of 2 mm, of not less than 90% at a wavelength of 10 μm. As such, the infrared imaging lens 1 in accordance with the present embodiment makes it possible to achieve an imaging lens exhibiting, over a wide wavelength range of at least 7 μm to 14 μm, little light absorption caused by a glass material of the lenses.

Further, the chalcogenide glass can be press-molded so as to form a lens having an aspherical surface. Thus, the lens having an aspherical lens is easily mass-produced with use of the chalcogenide glass. The glass material preferably has a glass transition temperature as low as not more than 200° C. and is desirably easily press-molded. In the infrared imaging lens 1, at least one of the lenses is an aspherical lens, so that aberration is prevented or reduced.

In a case where an aspherical lens cannot be applied, an infrared imaging lens for preventing or reducing aberration would be configured to have an increased number of lenses and thus have an increased weight and an increased size. This also results in an imaging lens which is costly and unsuitable for commercial use. Note that "aspherical (surface)" as used herein encompasses "diffractive (surface)".

The chalcogenide glass can be also press-molded so as to form a lens having a surface particularly complicated in shape, such as a diffractive surface. Thus, with use of the chalcogenide glass, a surface of at least one of the lenses of the infrared imaging lens 1 is formed to be a diffractive surface, so that it is possible to satisfactorily prevent or reduce aberration in a wide wavelength range of 7 μm to 14 μm.

Crystalline materials, such as silicon (Si), germanium (Ge), zinc sulfide (ZnS), and zinc selenide (ZnSe), each of which is used as a material that transmits therethrough light in a far-infrared region, cannot be press-molded. This makes it difficult to mass-produce an aspherical lens having a complicated shape. It is therefore difficult to use such a crystalline material to achieve a low-cost commercial aspherical lens.

<Details of Configuration of Each Lens>

Further, the infrared imaging lens 1 in accordance with the present embodiment can be configured to have details of each part as described below.

In order to enable achievement of an imaging device that allows a distant object to be enlarged and observed, the infrared imaging lens 1 in accordance with the present embodiment is configured to have a total system focal length fL not less than two times larger than a diameter φs of an image circle of the infrared imaging lens 1. This may be also defined as having a half angle of view of not more than 14°.

In particular, the infrared imaging lens 1 in accordance with the present embodiment is preferably configured to have a total system focal length fL three times to six times larger than a diameter of the image circle. An absolute value of the total system focal length fL is preferably 15 mm to 30 mm.

The infrared imaging lens 1 in accordance with the present embodiment is an infrared imaging lens that may be used in an infrared region including a wavelength in a range of 7 µm to 14 µm. Using the above-described chalcogenide glass as a glass material for each lens makes it possible to achieve excellent properties over a wide wavelength range of 7 µm to 14 µm.

According to the present embodiment, such a telephoto lens can be configured to achieve a bright imaging lens having an f-number in a range of 0.9 to 1.1. Further, it is possible to achieve a telephoto lens exhibiting, over a wide wavelength range of at least 7 µm to 14 µm, little light absorption caused by a glass material of the lenses. This, combined with a low f-number of approximately 1, makes it possible to achieve a bright imaging lens.

The first lens L1 has positive refractive power and has a meniscus shape having a convex surface on the object side. The second lens L2 has positive refractive power and has a meniscus shape having a convex surface on an image plane side. The third lens L3 has positive refractive power and has a meniscus shape having a convex surface on the object side. Configuring and disposing each of the lenses in such a manner make it possible to reduce an increase in Petzvar sum. As a result, field curvature is prevented or reduced so that planarity of a focal plane of the infrared imaging lens 1 can be maintained.

Further, it is particularly preferable that the power of the third lens L3, the power of the first lens L1, and the power of the second lens L2 decrease in this order. In a case where the infrared imaging lens 1 is configured such that (i) the third lens L3 located closest to the image plane has a highest power and (ii) the third lens L3 has a meniscus shape having a convex surface on the image plane S side, astigmatism is reduced.

The infrared imaging lens 1 is preferably configured such that a focal length f1 of the first lens L1 and the total system focal length fL satisfy the following relational expression:

$$1.6 \le f1/fL \le 2.5.$$

That is, the infrared imaging lens 1 is preferably configured such that the first lens L1 does not significantly contribute to the total system focal length fL and such that the second lens L2 and the third lens L3 in addition to the first lens L1 contribute to the total system focal length f1. Such a configuration of the infrared imaging lens 1 makes it possible to obtain high resolution suitable for an image sensor having a pixel pitch equivalent to the wavelength, while keeping aberration properties of the infrared imaging lens 1 excellent.

Further, the infrared imaging lens 1 is preferably configured such that the total system focal length fL and a total track length TTL which is a distance on an optical axis from an object-side surface (first surface) of the first lens L1 to the image plane S satisfy the following relational expression:

$$1.2 \le TTL/fL \le 2.0.$$

That is, the infrared imaging lens 1 is preferably configured such that the total track length TTL is somewhat larger than the total system focal length fL. Such a configuration of the infrared imaging lens 1 makes it possible to obtain high resolution suitable for an image sensor having a pixel pitch equivalent to the wavelength, while keeping aberration properties of the infrared imaging lens 1 excellent.

The infrared imaging lens 1 is preferably configured such that an effective diameter of the image plane-side surface (second surface) of the first lens L1 serves as an aperture of the infrared imaging lens 1. Such a configuration makes it possible to reduce vignetting of peripheral light beams and increase peripheral light quantity. In particular, it is possible to secure a relative illuminance of approximately 100% even at the maximum image height. Further, it is possible to reduce the outer diameter and the volume of the infrared imaging lens 1 in comparison to a case where an aperture diaphragm is inserted between the lenses.

The infrared imaging lens 1 is preferably configured such that the total system focal length fL and a back focal length BFL satisfy the following relational expression:

$$0.2 \le BFL/fL.$$

Such a configuration makes it possible to achieve a telephoto lens which is excellent in aberration properties and resolution and in which the back focal length BFL is secured.

It is preferable that at least one selected from the group consisting of the first lens L1, the second lens L2, and the third lens L3 is an aspherical lens. This makes it possible to reduce spherical aberration and astigmatism of the infrared imaging lens 1. In particular, the first lens L1 is preferably an aspherical lens. The first lens L1 can be configured to have (i) an object-side surface (first surface) which is a spherical surface and (ii) an image plane S-side surface (second surface) which is an aspherical surface.

Further, either one of the surfaces of the second lens L2 or the third lens L3 is preferably a diffractive surface. This makes it possible to generate negative dispersion and reduce longitudinal chromatic aberration and transverse chromatic aberration. In particular, an object-side surface (third surface) of the second lens L2 is preferably a diffractive surface. In a case where, as described above, a concave surface is a diffractive surface, it is easier to form the diffractive surface through press-molding.

The infrared imaging lens 1 is configured to have, at an image height of 2.5 mm on the image plane S, a modulation transfer function (MTF) of not less than 0.3 (30%) in a wavelength range of 7 µm to 14 µm at a spatial frequency of 41.7 cycles/mm. Here, the "MTF" refers to a simple average value of an MTF in a tangential direction and an MTF in a sagittal direction. The following will describe the reason for focusing on the spatial frequency of 41.7 cycles/mm and the image height of 2.5 mm.

As a result of progress in size reduction of image sensors in mid- and far-infrared regions, pixel pitches of the image sensors have reached a narrow pitch limit substantially equivalent to the wavelength. Such an image sensor having a reduced size can be manufactured at a low cost, as compared with the one having a large surface area. Further, a diameter of an imaging lens applied to such an image sensor also can be reduced in accordance with the surface area of the image sensor, and accordingly, it is possible to reduce the cost of the imaging lens.

Thus, application of such an image sensor and such an imaging lens to an infrared camera makes it possible to reduce a cost of the infrared camera so that the infrared camera can be suitable for a commercial use, and allows the infrared camera to be employed in various fields. As an image sensor for a 10 µm-band wavelength region, an image sensor having a pixel pitch of 12 µm has been commercially available. The spatial frequency of 41.7 cycles/mm corresponds to a Nyquist frequency of the image sensor having a pixel pitch of 12 μm.

An MTF of not less than 0.3 at an image height of 2.5 mm indicates that sufficient resolution with an MTF of not less than 0.3 can be obtained in an entire region of an image sensor that is disposed at the image plane S and that has 320×256 pixels having a pixel pitch of 12 μm. That is, the infrared imaging lens 1 is a telephoto lens that covers a wavelength region of approximately 7 μm to 14 μm and that can be sufficiently adapted to a far-infrared camera to which a QVGA (320×240 pixels) class image sensor having a reduced size is applied.

In addition, the infrared imaging lens 1 is configured to have, at an image height 4.1 mm on the image plane S, an MTF of not less than 0.45 (45%) in a wavelength range of 7 μm to 14 μm at a spatial frequency of 29.4 cycles/mm. The spatial frequency of 29.4 cycles/mm corresponds to a Nyquist frequency of an image sensor having a pixel pitch of 17 μm.

An MTF of not less than 0.45 at a spatial frequency of 29.4 cycles/mm at an image height of 4.1 mm indicates that favorable resolution with an MTF of not less than 0.45 is obtained in an entire region of an image sensor that is disposed at the image plane S and that has 384×288 pixels having a pixel pitch of 17 μm. That is, the infrared imaging lens 1 is a telephoto lens that covers a wavelength region of approximately 7 μm to 14 μm and that has resolution with which the telephoto lens is also sufficiently adapted to an infrared camera to which an image sensor having a pixel pitch of approximately 12 μm to 17 μm is applied.

Numerical Example 1

The following description will discuss a numerical example of the infrared imaging lens 1. The cross-sectional view of the infrared imaging lens in accordance with Numerical Example 1 is as illustrated in FIG. 1. In Numerical Example 1, "r" represents a radius of curvature, "d" represents a lens thickness on the optical axis or a distance on the optical axis between surfaces, and "ED" represents an effective diameter (diameter). The unit of length is (mm). The symbol "*" (asterisk) following a numeral of the surface number indicates that a surface indicated by the surface number is an aspherical surface, and "DOE" indicates that a surface is a diffractive surface. Basic lens data, aspherical surface data, diffractive surface data, and various data are shown below.

TABLE 1

Numerical Example 1 Basic Lens Data

| Surface Number | r (mm) | d (mm) | N10 | v10 | ED (mm) |
|---|---|---|---|---|---|
| Object Surface | | ∞ | | | |
| 1 | 39.57211 | 2.95000 | 3.46501 | 253 | 28.174 |
| 2* | 54.93777 | 17.25857 | | | 26.881 |
| 3* (DOE) | −30.02252 | 2.80000 | 3.46501 | 253 | 24.065 |
| 4 | −29.09786 | 12.45668 | | | 25.377 |
| 5 | 15.50000 | 3.50000 | 3.46501 | 253 | 16.759 |
| 6 | 15.35000 | 4.83600 #1 | | | 13.957 |
| 7 | ∞ | 1.00000 | 3.41776 | 3129 | 10.617 |
| 8 | ∞ | 2.00129 | | | 10.340 |
| Image Plane | | | | | 8.224 |

1 Variable by Focusing

The refractive index and the Abbe number v10 are as defined below.

N8: a refractive index measured at a wavelength of 8 μm

N10: a refractive index measured at a wavelength of 10 μm

N12: a refractive index measured at a wavelength of 12 μm $$v10 = (N10 - 1)/(N8 - N12)$$

TABLE 2

Numeral Example 1 Aspherical Surface Data

| Coefficient | Second surface | Third Surface |
|---|---|---|
| κ | 0.0000000E+00 | 0.0000000E+00 |
| A2 | 0.0000000E+00 | 0.0000000E+00 |
| A4 | 1.0681494E−06 | 0.0000000E+00 |
| A6 | 2.0191263E−09 | 0.0000000E+00 |
| A8 | −2.5910578E−13 | 0.0000000E+00 |
| A10 | 1.3349582E−14 | 0.0000000E+00 |

An aspherical shape is defined as follows.

$$Z = \frac{h^2/r}{1 + \sqrt{1 - (1 + \kappa)(h/r)^2}} + \sum A_n h^n$$

h: Height from optical axis r: Vertex radius of curvature

κ: Conic constant

An: n-order aspherical coefficient (n is an even number)

Z: Distance at h from point on aspherical surface to tangential plane of aspherical vertex

TABLE 3

Numeral Example 1 Diffractive Surface Data

| Coefficient | Third Surface |
|---|---|
| P1 | −2.0181378E−01 |
| P2 | 2.7662167E−04 |

A diffractive surface is defined as below.

$$\Phi = P_1 \times h^2 + P_2 \times h^4$$

$$Z_{dif} = \frac{\lambda}{2\pi} \Phi$$

$$Z_{DOE} = \frac{1}{(N-1)} \times \mathrm{MOD}(Z_{dif}, -\lambda)$$

Φ: Phase difference function $P_1$, $P_2$: Phase coefficient $Z_{dif}$: Optical path function $Z_{DOE}$: Sag amount of diffractive surface λ: Designed center wavelength (assumed to be 10 μm)

TABLE 4

| Numerical Example 1 Various Data | |
|---|---|
| Aperture position | Corresponding to second surface. Aperture Diameter Φ26.881 mm |
| F Number | 1.0 |
| Maximum Half Angle of View | 8.4° |
| Maximum Image Height | 4.1 mm |
| Total System Focal Length | 28.0 mm |
| Back Focal Length | 7.84 mm (d6 + d7 + d8) |
| Total Track Length | 46.8 mm |

The first lens L1, the second lens L2, and the third lens L3 are each made of chalcogenide glass having a refractive index N10 of 3.465 measured at a wavelength of 10 μm. The parallel flat plate P is made of silicon (Si). The object-side surface (third surface) of the second lens L2 is a diffractive surface which is provided with sags in a kinoform shape. Each of the sags has a depth in a range from 0 to a value equivalent to the designed center wavelength A. The back focal length BFL, which is equal to 7.84 mm, is an actual distance.

The maximum image height on the image plane S is 4.1 mm. Thus, the image circle has a diameter φs of 8.2 mm. Therefore, the infrared imaging lens 1 is applicable to a QVGA-class image sensor, such as one which has a diagonal length of 8.16 mm and which has 384× 288 pixels having a pixel pitch of 17 μm. Further, the infrared imaging lens 1 can cover pixel regions of respective QVGA-class image sensors including QVGA (320×240 pixels) having a pixel pitch of 17 μm and QVGA+(345×240 pixels) having a pixel pitch of 17 μm.

It is needless to say that the infrared imaging lens 1 can cover a pixel region of a QVGA-class image sensor which has 320×256 pixels having a pixel pitch of 12 μm. Note that the configuration of the 384×288 pixels, the 320×256 pixels, or the like makes it possible to secure the number of effective pixels of the QVGA (320×240 pixels) even if the optical axis of the lens is not perfectly concentric with the image sensor.

A ratio of the total system focal length fL of the infrared imaging lens 1 to a diameter φs of the image circle of the infrared imaging lens 1 is as follows:

$$fL/\varphi s = 3.41.$$

That is, the infrared imaging lens 1 is a telephoto lens. In addition, the infrared imaging lens 1 has a half angle of view of 8.4°. This is within a range of not more than 14°, within which the infrared imaging lens 1 can be regarded as a telephoto lens. The infrared imaging lens 1 is a telephoto lens having such a narrow angle of view and is an imaging lens having an f-number of 1.0, i.e., is a very bright imaging lens.

The infrared imaging lens 1 has (i) a total track length TTL (entire length of the optics) of 46.8 mm as measured from the object-side surface (first surface) of the first lens L1 to the image plane S and (ii) a maximum effective diameter of 28.2 mm on an optical path, and is thus compact. Further, the infrared imaging lens 1 has a triple-lens configuration and can be made lightweight. In combination with the fact that each lens can be press-molded, the infrared imaging lens 1 can be produced at a low cost that allows the infrared imaging lens 1 to be applied to a commercial use.

The first lens L1 has a focal length f1 of 50.50 mm. Thus, a ratio of the focal length f1 of the first lens L1 to the total system focal length fL of the infrared imaging lens 1 is as follows:

$$f1/fL = 1.80.$$

The second lens L2 has a focal length f2 of 121.51 mm. The third lens L3 has a focal length f3 of 41.25 mm. Thus, the infrared imaging lens 1 is configured such that the third lens L3 and the first lens L1 have the highest power and the second highest power, respectively.

A ratio of the total track length TTL (entire length of the optics) of the infrared imaging lens 1 to the total system focal length fL of the infrared imaging lens 1 is as follows:

$$TTL/fL = 1.67.$$

The back focal length BFL is 7.84 mm (actual length) and thus secures a sufficient distance. A ratio of the total track length TTL (entire length of the optics) to the back focal length BFL is as follows:

$$TTL/BFL = 5.97.$$

Figure 3:
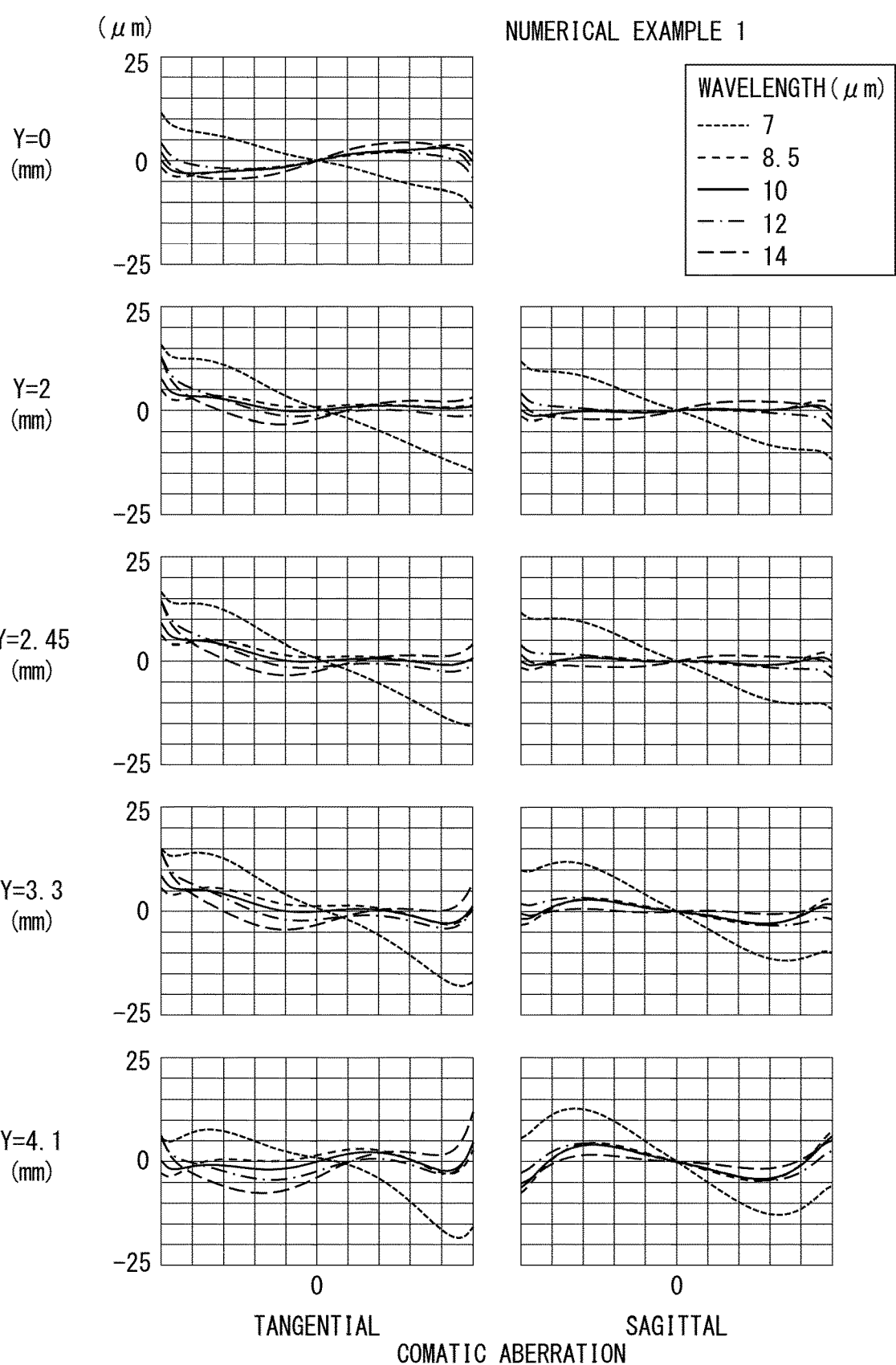
FIG. 3 is an aberration diagram illustrating comatic aberration of the infrared imaging lens in accordance with Numerical Example 1 of the present invention.

FIGS. 2 to 7 show various performances of the infrared imaging lens 1 in Numerical Example 1. FIGS. 2 and 3 are aberration diagrams of the infrared imaging lens 1. FIG. 2 shows spherical aberration, astigmatism, and distortion. For the spherical aberration, the astigmatism, and the distortion, graphs with respect to wavelengths ranging from 7 μm to 14 μm are shown. FIG. 3 is an aberration diagram illustrating comatic aberration at image heights Y ranging from 0 mm up to the maximum image height, for each of a tangential (meridional) direction and a sagittal (radial) direction. As illustrated in FIGS. 2 and 3, the infrared imaging lens 1 in accordance with Numerical Example 1 has various types of aberration satisfactorily corrected over a wide wavelength region of 7 μm to 14 μm.

Figure 4:
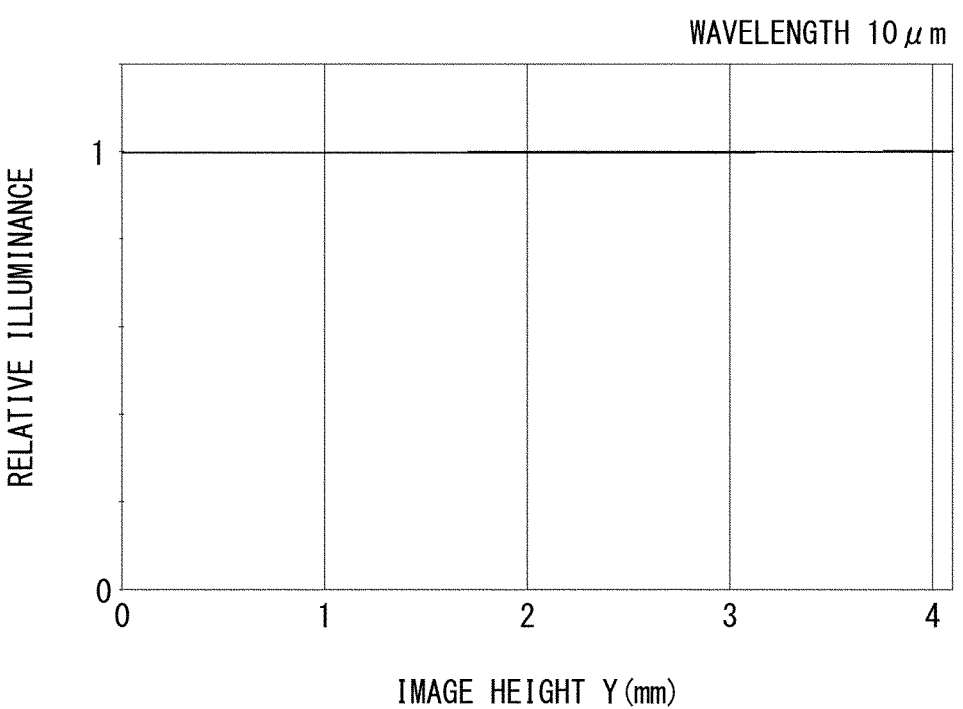
FIG. 4 is a graph showing image height dependence of a relative illuminance of the infrared imaging lens in accordance with Numerical Example 1 of the present invention.

FIG. 4 is a graph showing a relative illuminance with respect to an image height Y in Numerical Example 1 of the infrared imaging lens 1. Note here that the relative illuminance refers to an illuminance ratio of a certain region to a region on the optical axis (image plane central region) on the image plane S. As shown in FIG. 4, even at a maximum image height of 4.11 mm, the relative illuminance is approximately 1, that is, a highly uniform light-quantity distribution is obtained in the image circle.

Figure 5:
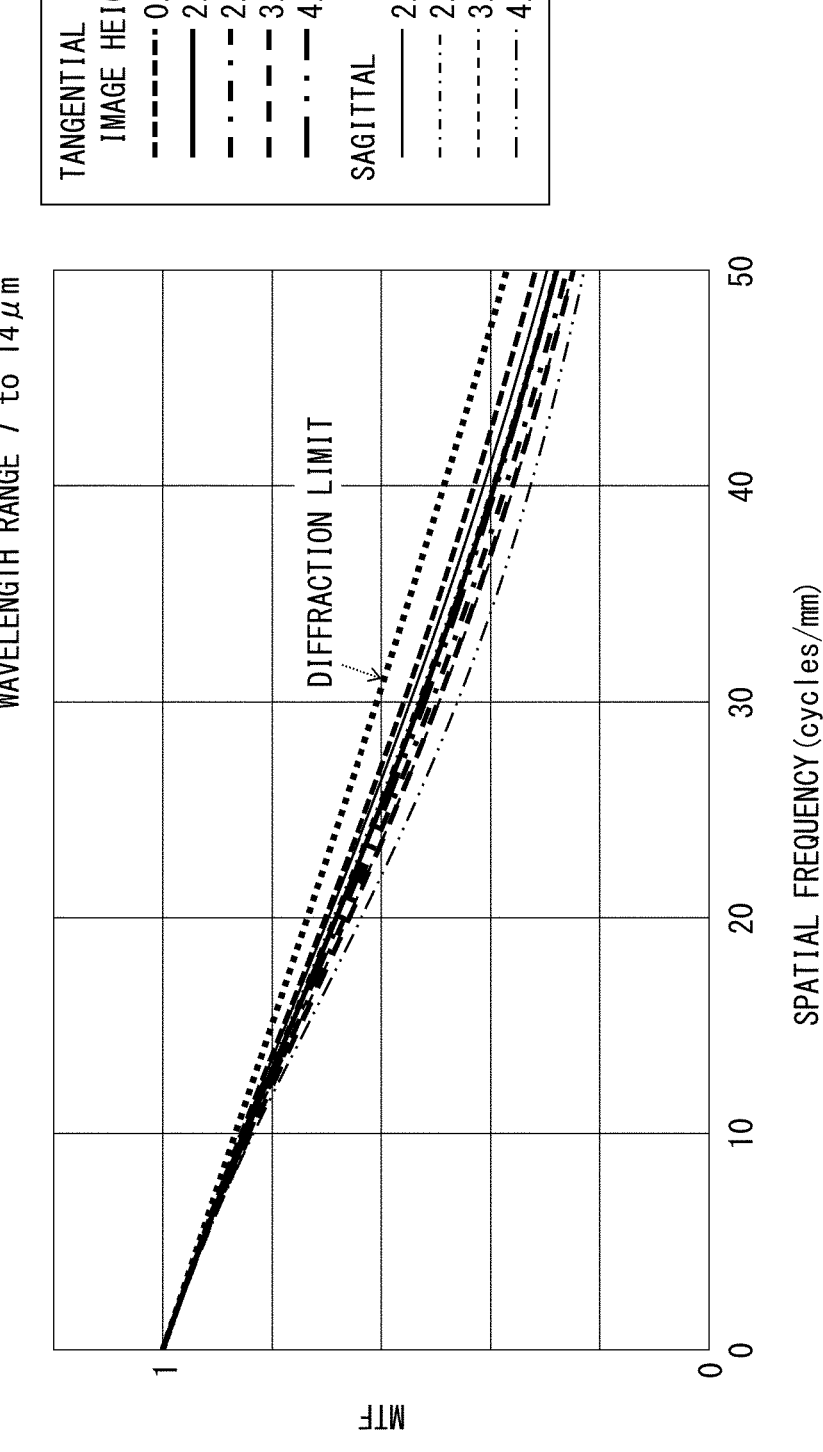
FIG. 5 is a graph showing spatial frequency dependence of an MTF measured in a wavelength range of 7 μm to 14 μm, of the infrared imaging lens in accordance with Numerical Example 1 of the present invention.

FIG. 5 is a graph showing spatial frequency dependence of an MTF in a wavelength range of 7 μm to 14 μm. An image sensor having 320×256 pixels having a pixel pitch of 12 μm has a Nyquist frequency $f_N$ of 41.7 cycles/mm and a maximum image height of 2.46 mm. At the Nyquist frequency $f_N$ of 41.7 cycles/mm, the MTF at the center of the image is 0.41, and thus MTF>0.36 (a simple average value of an MTF in a tangential direction and an MTF in a sagittal direction) is secured in a region of the image sensor.

In addition, an image sensor having 384×288 pixels having a pixel pitch of 17 μm has a Nyquist frequency $f_N$ of 29.4 cycles/mm and a maximum image height of 4.08 mm. At the Nyquist frequency f of 29.4 cycles/mm, the MTF at the center of the image is 0.57, and thus MTF>0.49 (the simple average value of the MTF in the tangential direction and the MTF in the sagittal direction) is secured in a region of the image sensor.

As described above, the infrared imaging lens 1 secures favorable resolution even when evaluated with use of MTFs over a wide wavelength range of 7 μm to 14 μm in regions of respective QVGA-class image sensors which have pixel pitches ranging from approximately 12 μm to 17 μm.

Figure 6:
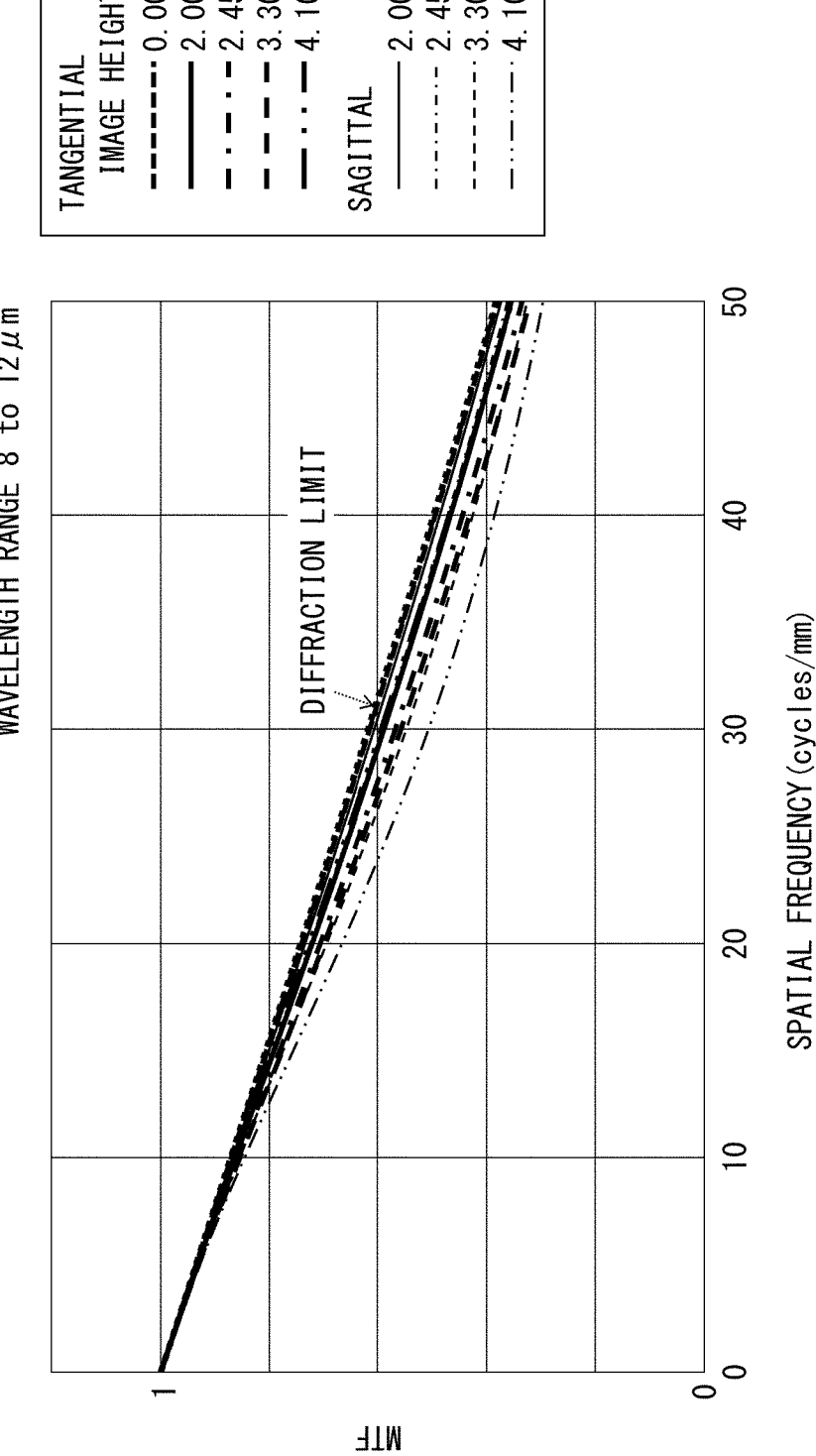
FIG. 6 is a graph showing spatial frequency dependence of the MTF measured in a wavelength range of 8 μm to 12 μm, of the infrared imaging lens in accordance with Numerical Example 1 of the present invention.

FIG. 6 is a graph showing spatial frequency dependence of an MTF in a wavelength range of 8 μm to 12 μm. With respect to the image sensor having 320×256 pixels having a pixel pitch of 12 μm, at a Nyquist frequency $f_N$ of 41.7 cycles/mm, the MTF at the center of the image is 0.47, and thus MTF>0.43 (the simple average value of the MTF in the tangential direction and the MTF in the sagittal direction) is secured in the region of the image sensor.

With respect to the image sensor having 384×288 pixels having a pixel pitch of 17 μm and, at a Nyquist frequency $f_N$ of 29.4 cycles/mm, the MTF at the center of the image is 0.62, and thus MTF>0.55 (the simple average value of the MTF in the tangential direction and the MTF in the sagittal direction) is secured in the region of the image sensor. As described above, the infrared imaging lens 1 secures favorable resolution in regions of respective QVGA-class image sensors which have pixel pitches ranging from approximately 12 μm to 17 μm.

Figure 7:
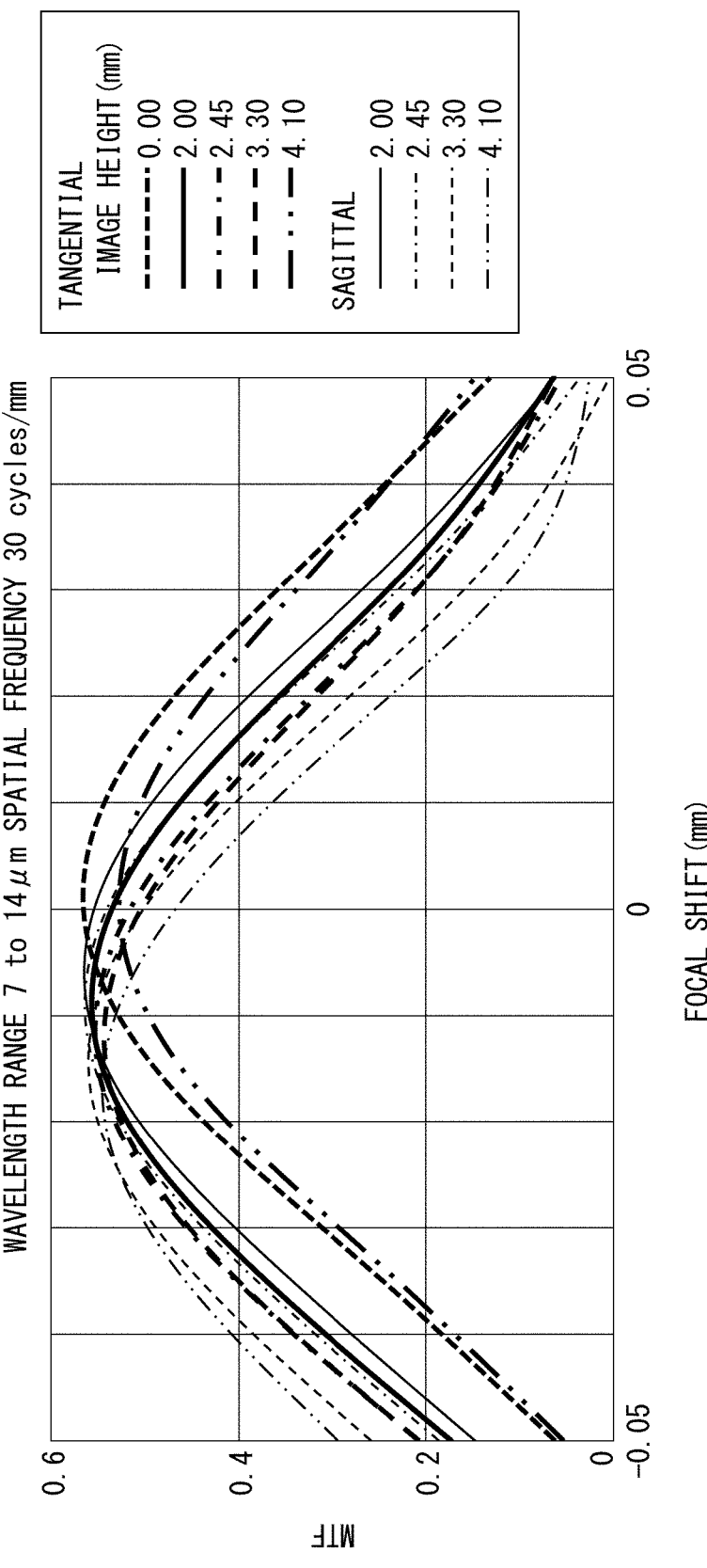
FIG. 7 is a graph showing focal shift dependence of the MTF of the infrared imaging lens in accordance with Numerical Example 1 of the present invention.

It is needless to say that, as described above, as long as the wavelength range is within 7 μm to 14 μm, the infrared imaging lens 1 can have favorable properties within any wavelength range of, for example, 7 μm to 12 μm, 8 μm to 12 μm, or 8 μm to 10 μm. FIG. 7 is a graph showing a change in MTF with respect to a focal shift, in the wavelength range of 7 μm to 14 μm.

As described above, the infrared imaging lens 1 in Numerical Example 1 can cover a wavelength range of 7 μm to 14 μm and has favorable resolution that is sufficiently suitable for a QVGA-class image sensor which has a pixel pitch of approximately 12 μm to 17 μm. The infrared imaging lens 1 has an f-number of 1.0 and is thus bright, and is also compact. As described above, the present embodiment makes it possible to achieve an infrared imaging lens which is a telephoto lens that has not existed conventionally and that is compact and has excellent properties.

Aspects of the present invention can also be expressed as follows:

Aspect 1 of the present invention is an infrared imaging lens used in an infrared region including at least a wavelength in a range of 7 μm to 14 μm, the infrared imaging lens including a first lens, a second lens, and a third lens that are disposed in this order from an object side to an image plane side, each of the first lens, the second lens, and the third lens being made of chalcogenide glass having a refractive index of 2.5 to 4.0 measured at a wavelength of 10 μm, the infrared imaging lens having a total system focal length fL not less than two times larger than a diameter of an image circle of the infrared imaging lens.

The above configuration makes it possible to achieve an infrared imaging lens that is a telephoto lens which has excellent resolution suitable for an image sensor having a pixel pitch substantially equivalent to the wavelength.

Aspect 2 of the present invention is an infrared imaging lens used in an infrared region including at least a wavelength in a range of 7 μm to 14 μm, the infrared imaging lens including a first lens, a second lens, and a third lens that are disposed in this order from an object side to an image plane side, each of the first lens, the second lens, and the third lens being made of chalcogenide glass having a refractive index of 2.5 to 4.0 measured at a wavelength of 10 μm, the infrared imaging lens having a half angle of view of not more than 14°.

The above configuration makes it possible to achieve an infrared imaging lens that is a telephoto lens which has excellent resolution suitable for an image sensor having a pixel pitch substantially equivalent to the wavelength.

In Aspect 3 of the present invention, the infrared imaging lens in accordance with Aspect 1 or 2 is configured such that each of the first lens, the second lens, and the third lens is a meniscus lens having a positive power. The above configuration makes it possible to achieve an infrared imaging lens which is excellent in aberration properties.

In Aspect 4 of the present invention, the infrared imaging lens in accordance with Aspect 3 is configured such that each of the first lens and the third lens has a meniscus shape that is convex on the object side, and the second lens has a meniscus shape that is convex on the image plane side. The above configuration makes it possible to suppress an increase in Petzvar sum, so that field curvature is prevented or reduced.

In Aspect 5 of the present invention, an infrared imaging lens in accordance with Aspects 1 to 4 is configured such that an effective diameter of an image plane-side surface of the first lens corresponds to an aperture of the infrared imaging lens. The above configuration makes it possible to reduce vignetting of peripheral light beams and increase peripheral light quantity.

In Aspect 6 of the present invention, the infrared imaging lens in accordance with Aspects 1 to 5 is configured such that the first lens is an aspherical lens. The above configuration makes it possible to achieve an infrared imaging lens which is particularly excellent in aberration properties.

In Aspect 7 of the present invention, the infrared imaging lens in accordance with Aspects 1 to 6 is configured such that either one of surfaces of the second lens or the third lens is a diffractive surface. The above configuration makes it possible to reduce longitudinal chromatic aberration and transverse chromatic aberration.

In Aspect 8 of the present invention, the infrared imaging lens in accordance with Aspects 1 to 7 is configured such that a focal length f1 of the first lens and a total system focal length fL of the infrared imaging lens satisfy the following relational expression: $1.6 \leq f1/fL \leq 2.5$. The above configuration makes it possible to achieve high resolution that is suitable for an image sensor having a pixel pitch equivalent to the wavelength, while keeping aberration properties of the infrared imaging lens excellent.

In Aspect 9 of the present invention, the infrared imaging lens in accordance with Aspects 1 to 8 is configured such that a total system focal length fL of the infrared imaging lens and a total track length TTL which is a distance on an optical axis from an object-side surface of the first lens to an image plane satisfy the following relational expression: $1.2 \leq TTL/fL \leq 2.0$. The above configuration makes it possible to achieve high resolution that is suitable for an image sensor having a pixel pitch equivalent to the wavelength, while keeping aberration properties of the infrared imaging lens excellent.

In Aspect 10 of the present invention, the infrared imaging lens in accordance with Aspects 1 to 9 is configured such that a back focal length BFL and a total system focal length fL which is a distance on an optical axis from an object-side surface of the first lens to an image plane satisfy the following relational expression: $0.2 \leq BFL/fL$. The above configuration makes it possible to achieve a telephoto lens which is excellent in aberration properties and resolution and in which the back focal length BFL is secured.

In Aspect 11 of the present invention, the infrared imaging lens in accordance with Aspects 1 to 10 is configured such that the infrared imaging lens has a relative illuminance of not less than 98% on an image plane in an image circle of the infrared imaging lens. The above configuration makes it possible to achieve an infrared imaging lens in which a sufficient peripheral light quantity is secured.

In Aspect 12 of the present invention, the infrared imaging lens in accordance with Aspects 1 to 11 is configured such that a modulation transfer function of the infrared imaging lens in a wavelength range of 7 μm to 14 μm at a spatial frequency of 41.7 cycles/mm is not less than 0.3 at an image height of 2.5 mm. The above configuration makes it possible to achieve an infrared imaging lens that can provide favorable resolution over an entire region of an image sensor having a pixel pitch substantially equivalent to the wavelength.

In Aspect 13 of the present invention, the infrared imaging lens in accordance with Aspects 1 to 12 is configured such that the infrared imaging lens has a total system focal length fL three times to six times larger than a diameter of an image circle of the infrared imaging lens. The above configuration makes it possible to achieve an infrared imaging lens which is a telephoto lens excellent in aberration properties and resolution.

In Aspect 14 of the present invention, the infrared imaging lens in accordance with Aspects 1 to 13 is configured such that the infrared imaging lens has an f-number of 0.9 to 1.1. The above configuration makes it possible to achieve an infrared imaging lens which is a telephoto lens excellent in aberration properties and resolution and which has a small f-number and thus is bright.

In Aspect 15 of the present invention, the infrared imaging lens in accordance with Aspect 1 to 14 is configured such that the chalcogenide glass has an infrared absorption edge wavelength of not less than 18 μm at which the chalcogenide glass has a light transmittance of 20% measured at a thickness of 2 mm. The above configuration makes it possible to configure an infrared imaging lens which exhibits very little light absorption in a wavelength range of at least 7 μm to 14 μm.

The present invention is not limited to the embodiments, but can be altered by a skilled person in the art within the scope of the claims. The present invention also encompasses, in its technical scope, any embodiment derived by combining technical means disclosed herein. Further, it is possible to form a new technical feature by combining the technical means disclosed herein.

REFERENCE SIGNS LIST

1 Infrared imaging lens
L1 First lens
L2 Second lens
L3 Third lens
P Parallel flat plate
S Image plane
AP Aperture

The invention claimed is:

1. An infrared imaging lens used in an infrared region including at least a wavelength in a range of 7 μm to 14 μm, the infrared imaging lens comprising a first lens, a second lens, and a third lens that are disposed in this order from an object side to an image plane side, each of the first lens, the second lens, and the third lens being made of chalcogenide glass having a refractive index of 2.5 to 4.0 measured at a wavelength of 10 μm, the infrared imaging lens having a total system focal length fL in a range of three times to six times larger than a diameter of an image circle of the infrared imaging lens, wherein an absolute value of the total system focal length fL is within a range of 15 mm to 30 mm, and wherein a focal length f1 of the first lens and the total system focal length fL of the infrared imaging lens satisfy the following relational expression: $1.6 \leq f1/fL \leq 2.5$.

2. An infrared imaging lens used in an infrared region including at least a wavelength in a range of 7 μm to 14 μm, the infrared imaging lens comprising a first lens, a second lens, and a third lens that are disposed in this order from an object side to an image plane side, each of the first lens, the second lens, and the third lens being made of chalcogenide glass having a refractive index of 2.5 to 4.0 measured at a wavelength of 10 μm, the infrared imaging lens having a half angle of view of not more than 14°, wherein an absolute value of a total system focal length fL is within a range of 15 mm to 30 mm, wherein an effective diameter of an object-side surface of the first lens is larger than an effective diameter of an image plane-side surface of the second lens, and wherein a focal length f1 of the first lens and the total system focal length fL of the infrared imaging lens satisfy the following relational expression: $1.6 \leq f1/fL \leq 2.5$.

3. The infrared imaging lens according to claim 1, wherein each of the first lens, the second lens, and the third lens is a meniscus lens having a positive power.

4. The infrared imaging lens according to claim 3, wherein:

each of the first lens and the third lens has a meniscus shape that is convex on the object side; and the second lens has a meniscus shape that is convex on the image plane side.

5. The infrared imaging lens according to claim 1, wherein an effective diameter of an image plane-side surface of the first lens corresponds to an aperture of the infrared imaging lens.

6. The infrared imaging lens according to claim 1, wherein the first lens is an aspherical lens.

7. The infrared imaging lens according to claim 1, wherein either one of surfaces of the second lens or the third lens is a diffractive surface.

8. The infrared imaging lens according to claim 1, wherein the total system focal length fL of the infrared imaging lens and a total track length TTL which is a distance on an optical axis from an object-side surface of the first lens to an image plane satisfy the following relational expression:

$$1.2 \leq TTL/fL \leq 2.0.$$

9. The infrared imaging lens according to claim 1, wherein a back focal length BFL and the total system focal length fL which is a distance on an optical axis from an object-side surface of the first lens to an image plane satisfy the following relational expression:

$$0.2 \leq BFL/fL.$$

10. The infrared imaging lens according to claim 1, the infrared imaging lens having a relative illuminance of not less than 98% on an image plane in an image circle of the infrared imaging lens.

11. The infrared imaging lens according to claim 1, wherein a modulation transfer function of the infrared imaging lens in a wavelength range of 7 μm to 14 μm at a spatial frequency of 41.7 cycles/mm is not less than 0.3 at an image height of 2.5 mm.

12. The infrared imaging lens according to claim 2, the infrared imaging lens having the total system focal length fL three times to six times larger than a diameter of an image circle of the infrared imaging lens.

13. The infrared imaging lens according to claim 1, the infrared imaging lens having an f-number of 0.9 to 1.1.

14. The infrared imaging lens according to claim 1, wherein the chalcogenide glass has a refractive index of 2.9 to 3.7 measured at a wavelength of 10 μm.

\* \* \* \* \*